Nov. 27, 1928.
W. GANZ
LOCK
Filed June 15, 1927
1,692,826
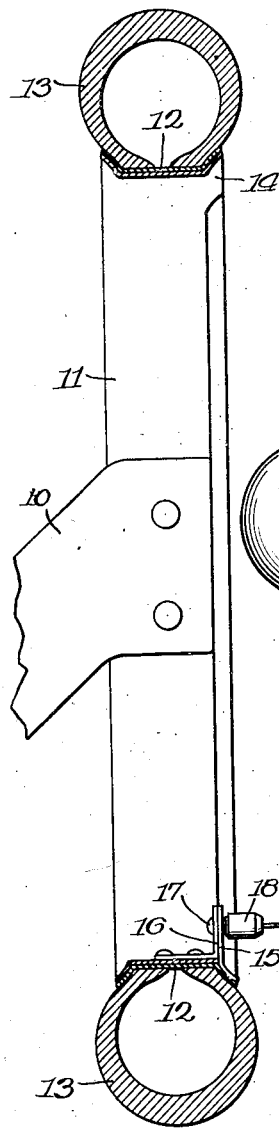
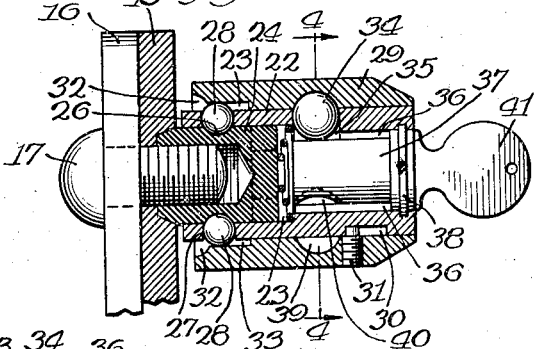
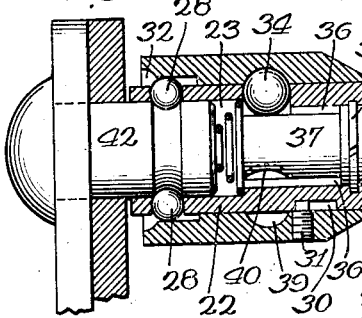
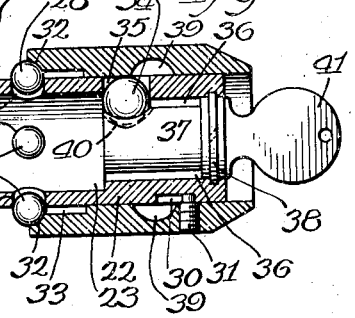
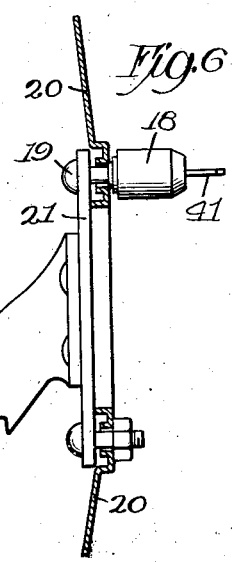
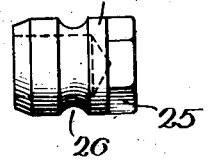
Inventor:
William Ganz
By Wilson, Mann & Cox,
Attys.

Patented Nov. 27, 1928.

1,692,826

UNITED STATES PATENT OFFICE.

WILLIAM GANZ, OF CHICAGO, ILLINOIS.

LOCK.

Application filed June 15, 1927. Serial No. 198,996.

The principal object of this invention is to provide a simple lock fastening that will effectually prevent the theft of automobile accessories and the like; that may be produced at low cost; and that will be of conveniently small dimensions.

Further objects and advantages of the invention will appear as the description is read in connection with the accompanying drawings, in which Fig. 1 is a vertical section of the conventional spare rim carrier, and a conventional rim and tire with the invention applied thereto;

Fig. 2 is an enlarged vertical section through the lock device, and a bolt on the carrier;

Fig. 3 is a view similar to Fig. 2, showing the lock device in released position;
Fig. 4 is a transverse section taken on the line 4—4 of Fig. 3;

Fig. 5 is a side elevation of a nut suitable for cooperation with the lock device shown in Figs. 2, 3 and 4;
Fig. 6 is a fragmentary sectional view illustrating the application of the lock device to one of the studs for securing a spare wheel on its carrier, and Fig. 7 is a sectional view similar to Fig. 2, illustrating the application of the device directly to a stud or bolt.

But neither these specific illustrations nor the corresponding description are intended to require a limited interpretation of the claims.

Referring to Fig. 1, 10 is a bracket supporting the conventional rim carrier 11, upon which is mounted a rim 12 equipped with a tire 13. The rim is secured on the carrier by one or more fixed locks 14 and a detachable clip 15 secured to an angle bracket 16 on the carrier by a bolt 17. All these parts are of conventional or any suitable form. The lock device is indicated generally at 18, applied to a nut on the bolt 17.

In Fig. 6 it is similarly indicated as applied to a bolt 19 for securing a spare wheel 20 to a conventional spare wheel holder 21.

A lock barrel 22 (Figs. 2, 3 and 4) has a longitudinal bore 23 of suitable size and depth for receiving a nut 24 equipped with a wrench seat 25 at one end and provided with a circumferential groove 26 in its intermediate portion. According to one application of this invention, this nut is substituted for a conventional nut on the bolts 17 or 19.

The barrel 22 adjacent to one end is provided with a plurality of transverse bores 27 of greater diameter than the wall of the bore 23. Lock bolts 28, here shown as small balls, are received in the transverse bores and, when in the position shown in Fig. 2, project into the groove 26 and make a swivel connection between the barrel 22 and the nut 24. The balls 28 are held in this position by a sleeve 29 having a limited sliding movement on the barrel 22 by virtue of the slot 30 and the threaded stud 31. The left edge of the bore in the sleeve, as it appears in Figs. 2 and 3, is curved like a ball race at 32, and the movement of the sleeve to the left permitted by the pin 31 in the slot 30, is just sufficient to permit the balls to move into this race, as best illustrated in Fig. 3, in which position they clear the body of the nut 24. Just inwardly of the race 32 the sleeve is counter bored at 33 whereby space for the balls is provided in the position shown in Fig. 2.

The sleeve and barrel are held in the position shown in Fig. 2 by a lock bolt 34, also illustrated as a ball, somewhat larger than the balls 28, and mounted in an additional transverse bore 35, extending through the wall of the barrel into a reduced extension of the bore 23, which has lateral grooves 36 to cooperate with tumblers (not shown) carried by the lock plug 37 rotatably mounted in the extension of the bore 23 and locked to the barrel by the split ring 38 lying in opposed grooves in the barrel and the plug.

The bore 35 in which the ball 34 is mounted is adapted, in the position shown in Fig. 2, to align with the depression or groove 39 in the bore of the sleeve and a depression 40 in the lock plug. When the plug is in the position shown in Fig. 2, the cylindrical surface thereof holds the ball 34 in the groove or depression 39 and thus prevents longitudinal movement of the sleeve on the barrel and, hence, holds the balls 28 in the groove 26, in the nut 24. By inserting the key 41 the plug may be rotated to bring the depression beneath the ball 34, which will permit the latter to unlock the sleeve 29 and permit it to take the position shown in Fig. 3, when the lock device may be retracted from the nut and a wrench applied for removing the latter from the bolt 17.

The inner edges of the bores 27 are slightly reduced, as shown in Figs. 2 and 3, to prevent the balls from escaping into the bore 23, when the lock device is removed from the nut.

When it is desired to lock the rim, wheel or other device, the nut is applied to the bolt or stud; the lock device, with the parts in the position shown in Fig. 3 is placed over the nut, the sleeve 29 is slid to the left, when the parts assume the position shown in Fig. 2, then the key is turned to lock the ball 34 in the depression 39. The lock device can then be rotated freely about the nut, but cannot be made to bind so as to unscrew the nut and will not permit the application of the wrench to the nut.

The use of a plurality of small balls or plungers 28, of any other suitable shape, permits the device to be made of relatively small diameter, thereby not only reducing the amount of material and labor necessary to its production, but also making it of a size more adapted to practical use.

The lock device can also be applied without using a nut, as shown in Fig. 7, where a stud 42 is shown provided with depressions to receive the balls 28, which together form a positive connection between the barrel and the stud.

I claim as my invention:

1. In a device of the class described, a lock barrel having a longitudinal bore and a plurality of transverse bores extending through the wall of the longitudinal bore and of a diameter greater than the thickness of said wall, balls in said transverse bores, a sleeve slidable on the barrel and adapted in one position to force the balls to project into the longitudinal bore and means for locking the sleeve in that position.

2. In a device of the class described, a lock barrel having a longitudinal bore and a plurality of transverse bores extending through the wall of the longitudinal bore and of a diameter greater than the thickness of said wall, balls in said transverse bores, a sleeve slidable on the barrel and adapted in one position to force the balls to project into the longitudinal bore, a bolt movable in the barrel to lock the sleeve in that position and lock mechanism for controlling said bolt.

3. In a device of the class described, a lock barrel having a longitudinal bore and a plurality of transverse bores extending through the wall of the longitudinal bore and of a diameter greater than the thickness of said wall, balls in said transverse bores, a sleeve slidable on the barrel and adapted in one position to force the balls to project into the longitudinal bore, a lock plug rotatably mounted in an extension of the longitudinal bore, a transverse bore through the wall of the extension of the longitudinal bore and of a diameter greater than the thickness of that bore, a depression in the inner wall of the sleeve, both adapted to align with the last mentioned transverse bore, a ball in said bore having a diameter greater than the wall having the bore.

4. In a device of the class described, a lock barrel having a longitudinal bore, and a plurality of transverse bores through the wall thereof, a sleeve surrounding the barrel and having a limited movement thereon, a plurality of bolts associated with the barrel and adapted to project into the longitudinal bore through the transverse bores when the sleeve is in a selected position and to be withdrawn when the sleeve is moved from that position, a bolt for locking the sleeve in the selected position and lock mechanism for controlling the last mentioned bolt.

5. In a device of the class described, a nut having a circumferential shoulder, a lock barrel having a longitudinal bore receiving the nut and a plurality of transverse bores communicating with the longitudinal bore, a sleeve surrounding the barrel and having limited movement thereon, a plurality of bolts associated with the barrel and adapted to project from the transverse bores and cooperate with the shoulder on the nut in a selected position of the sleeve and means for locking the sleeve in that position.

In testimony whereof I affix my signature.

WILLIAM GANZ.